(12) United States Patent
Heo et al.

(10) Patent No.: US 12,335,427 B2
(45) Date of Patent: Jun. 17, 2025

(54) EXECUTING APPLICATIONS IN CONJUNCTION WITH OTHER DEVICES

(71) Applicant: Samsung Electronics Co., Ltd., Gyeonggi-do (KR)

(72) Inventors: Chang-Ryong Heo, Gyeonggi-do (KR); Hyun-Seok Shin, Gyeonggi-do (KR); Ji-Hyun Park, Gyeonggi-do (KR); Sung-Hyuk Shin, Gyeonggi-do (KR); Myung-Gon Hong, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 18/382,566

(22) Filed: Oct. 23, 2023

(65) Prior Publication Data

US 2024/0098172 A1    Mar. 21, 2024

Related U.S. Application Data

(63) Continuation of application No. 17/485,998, filed on Sep. 27, 2021, now Pat. No. 11,800,004, which is a (Continued)

(30) Foreign Application Priority Data

Sep. 3, 2013    (KR) .................. 10-2013-0105772

(51) Int. Cl.
*H04M 1/72412*    (2021.01)
*G06K 7/10*    (2006.01)
(Continued)

(52) U.S. Cl.
CPC .......... *H04M 1/72412* (2021.01); *H04B 5/72* (2024.01); *H04W 4/80* (2018.02);
(Continued)

(58) Field of Classification Search
CPC ..... H04M 1/7253; H04W 76/14; H04W 4/80; H04W 12/06; H04W 4/20; H04W 84/18;
(Continued)

(56) References Cited

U.S. PATENT DOCUMENTS 8,620,286 B2 * 12/2013 Stannard ............ G06Q 30/0207
   705/14.67
9,182,965 B2 * 11/2015 Khushraj .................. G06F 8/61
(Continued)

FOREIGN PATENT DOCUMENTS

EP    2 611 208 A1    7/2013
EP    2 811 720 A2    12/2014
(Continued)

OTHER PUBLICATIONS

European Search Report dated Sep. 6, 2017.
(Continued)

*Primary Examiner* — Lewis G West
(74) *Attorney, Agent, or Firm* — Cha & Reiter, LLC

(57) ABSTRACT

A method and electronic device for executing application concurrently with other devices are provided. An address of an external electronic device and a location of an application is obtained. A connection is established with a device using a short-range communication protocol. The application is obtained and executed in conjunction with the device.

20 Claims, 9 Drawing Sheets

Related U.S. Application Data continuation of application No. 16/826,352, filed on Mar. 23, 2020, now Pat. No. 11,134,145, which is a continuation of application No. 16/246,606, filed on Jan. 14, 2019, now Pat. No. 10,601,976, which is a continuation of application No. 15/449,352, filed on Mar. 3, 2017, now Pat. No. 10,182,140, which is a continuation of application No. 14/475,079, filed on Sep. 2, 2014, now Pat. No. 9,596,561.

(51) Int. Cl.
| | | |
|---|---|---|
| *H04B 5/72* | (2024.01) | |
| *H04L 67/00* | (2022.01) | |
| *H04W 4/80* | (2018.01) | |
| *H04W 12/06* | (2021.01) | |
| *H04W 76/14* | (2018.01) | |
| *H04W 84/18* | (2009.01) | |
| *H04W 88/06* | (2009.01) | |

(52) U.S. Cl.
CPC ........... *H04W 12/06* (2013.01); *H04W 76/14* (2018.02); *G06K 7/10297* (2013.01); *H04L 67/34* (2013.01); *H04W 84/18* (2013.01); *H04W 88/06* (2013.01)

(58) Field of Classification Search
CPC ...... H04W 88/06; H04B 5/0031; H04L 67/34; G06K 7/10297
See application file for complete search history.

(56) References Cited

U.S. PATENT DOCUMENTS

| | | | | |
|---|---|---|---|---|
| 9,378,723 | B2* | 6/2016 | Bernal Castillo .. | G10K 11/1787 |
| 9,596,561 | B2* | 3/2017 | Heo ...................... | H04W 76/14 |
| 10,182,140 | B2* | 1/2019 | Heo ...................... | H04W 76/14 |
| 10,601,976 | B2* | 3/2020 | Heo ...................... | H04B 5/22 |
| 11,134,145 | B2* | 9/2021 | Heo ...................... | H04B 5/22 |
| 2003/0229723 | A1* | 12/2003 | Kangas ................. | G06F 9/4415 |
| | | | | 719/310 |
| 2005/0193389 | A1* | 9/2005 | Murphy ................. | G06F 8/61 |
| | | | | 717/169 |
| 2007/0174356 | A1* | 7/2007 | Horii ...................... | G06F 8/62 |
| | | | | 707/999.203 |
| 2009/0227282 | A1 | 9/2009 | Miyabayashi et al. | |
| 2010/0056047 | A1* | 3/2010 | Bertin ................ | H04M 1/72406 |
| | | | | 455/41.1 |
| 2011/0214158 | A1 | 9/2011 | Pasquerro et al. | |
| 2012/0191612 | A1 | 7/2012 | Spodak et al. | |
| 2013/0111463 | A1* | 5/2013 | Khushraj .................. | G06F 8/61 |
| | | | | 717/174 |
| 2013/0169418 | A1* | 7/2013 | Seo ................... | H04N 21/41265 |
| | | | | 340/10.1 |
| 2014/0181683 | A1 | 6/2014 | Lim et al. | |
| 2015/0067669 | A1* | 3/2015 | Mun ....................... | H04L 67/34 |
| | | | | 717/176 |
| 2016/0036949 | A1* | 2/2016 | Holden ................. | H04M 1/0254 |
| | | | | 455/557 |

FOREIGN PATENT DOCUMENTS

| | | |
|---|---|---|
| EP | 2 833 284 A1 | 2/2015 |
| KR | 10-2012-0030786 A | 3/2012 |
| WO | 2010/002497 A1 | 1/2010 |
| WO | 2014/175602 A1 | 10/2014 |

OTHER PUBLICATIONS

European Search Report dated Jan. 14, 2020.
European Search Report dated Jun. 18, 2021.
Notice of Patent Grant dated May 11, 2021.
Notice of Patent Grant dated Dec. 5, 2019.
Korean Search Report dated Apr. 17, 2020.
Korean Search Report dated May 20, 2019.

\* cited by examiner

EXECUTING APPLICATIONS IN CONJUNCTION WITH OTHER DEVICES

CROSS REFERENCE TO RELATED APPLICATIONS

This application is a Continuation of U.S. patent application Ser. No. 17/485,998 filed on Sep. 27, 2021 and assigned U.S. Pat. No. 11,800,004 issued on Oct. 24, 2023, which is a Continuation of U.S. patent application Ser. No. 16/826,352 filed on Mar. 23, 2020 and assigned U.S. Pat. No. 11,134,145 issued on Sep. 28, 2021, which is a Continuation of U.S. patent application Ser. No. 16/246,606 filed on Jan. 14, 2019 and assigned U.S. Pat. No. 10,601,976 issued on Mar. 24, 2020 which is a Continuation of U.S. patent application Ser. No. 15/449,352 filed on Mar. 3, 2017 and assigned U.S. Pat. No. 10,182,140 issued on Jan. 15, 2019 which is a Continuation of U.S. patent application Ser. No. 14/475,079 filed on Sep. 2, 2014 and assigned U.S. Pat. No. 9,596,561 issued on Mar. 14, 2017 which claims the benefit under 35 U.S.C. § 119(a) of a Korean patent application filed in the Korean Intellectual Property Office on Sep. 3, 2013 and assigned Serial No. 10-2013-0105772, the contents of which are herein incorporated by reference.

BACKGROUND

1. Field of the Disclosure

Various examples of the present disclosure relate to a method for working in conjunction with among electronic devices and electronic devices thereof.

2. Description of the Related Art

Short-range wireless communication heretofore may support real-time communication between electronic devices without needing complex electrical wiring therebetween. Short-range wireless communication may be convenient when signal exchange is needed between electronic devices located within a short distance of each other, such as in a house or an office. Such communication may be carried out without going through a network relay device, such as a base station, which may be located far away from the devices themselves. Thus, short range wireless communication may relieve the work load imposed on network relay devices.

Short-range wireless communication makes high-speed data transmission possible with very little delay; thus, short range communication is commonly used in, for example, mobile devices (e.g., portable phones, tablets, etc.). For example, short-range wireless communication is now used to provide many functions on mobile devices (e.g., telephony, audio playback, etc.) through an accessory (e.g., a headset and an earphone) which connects with the mobile device using short-range communication protocols, such as Blue Tooth.

SUMMARY

There is a need a solution for working in conjunction with among electronic devices and electronic devices thereof.

In view of the forgoing problems, an electronic device is provided. The electronic device may include at least one processor to: obtain an address of an external electronic device and a location of an application, the address and the location being obtained using a first short-range communication protocol; establish a connection with the external device using a second short-range communication protocol and the address of the external electronic device; obtain the application from the location of the application; and execute the application in conjunction with the external electronic device using the second short-range communication protocol.

In another aspect, disclosed herein is a method that may include: obtaining an address of a second electronic device and a location of an application, the address and the location being obtained using a first short-range communication protocol; establishing a connection with the second electronic device using a second short-range communication protocol and the address of the second electronic device; obtaining the application from the location of the application; and executing the application in conjunction with the second electronic device using the second short-range communication protocol.

In a further aspect, disclosed herein is a non-transitory computer-readable medium with instructions stored therein which upon execution instructs at least one processor to: obtain, by a first electronic device, an address of a second electronic device and a location of an application, the address and the location being obtained using a first short-range communication protocol; establish a connection with the second electronic device using a second short-range communication protocol and the address of the second electronic device; obtain the application from the location of the application; and execute the application in conjunction with the second electronic device using the second short-range communication protocol.

BRIEF DESCRIPTION OF THE DRAWINGS

The above features and advantages of the present disclosure will become more apparent from the following detailed description when taken in conjunction with the accompanying drawings in which.

DETAILED DESCRIPTION

Figure 1A:
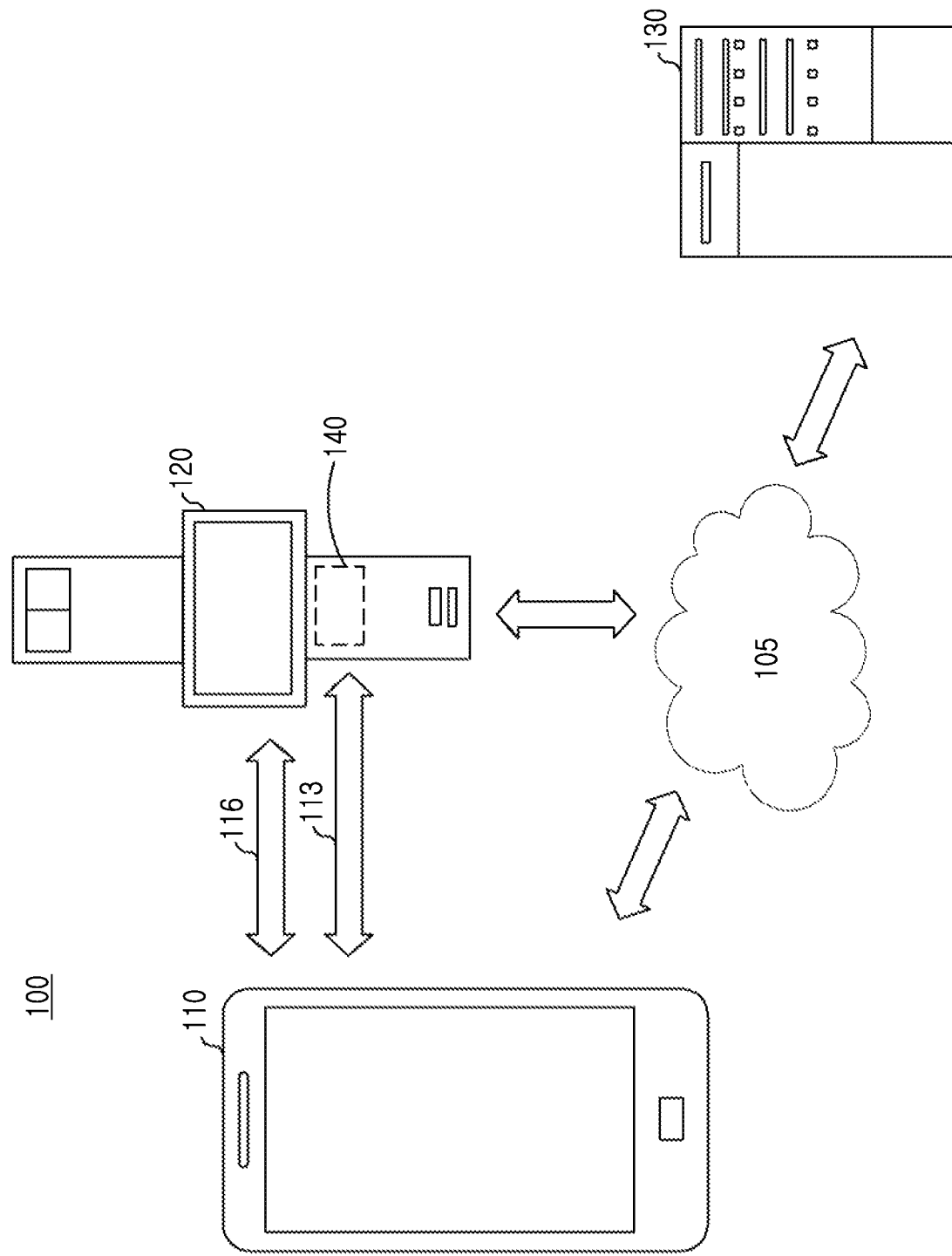
FIG. 1A and FIG. 1B illustrate an example short-range communication protocol system in accordance with aspects of the present disclosure.

Various modifications may be made to the examples provided herein. While specific examples are described in the detailed description and accompanying drawings, it is understood that these examples do not limit the present disclosure as defined by the appended claims. Therefore, it is understood that the examples described herein also include modifications, equivalents, or alternatives within the spirit and scope of the present disclosure. In the drawings, like reference numerals are used for like elements.

Expressions such as "comprise", "include", "may comprise", "may include" and the like indicate a disclosed function, operation, element and the like, but do not limit the disclosed function, operation, or element to just one function, operation, or element. Also, in the present disclosure, it should be understood that terms such as "comprise", "include", "have" and the like designate the existence of a feature stated in the specification, a numeral, a step, an operation, an element, a component, or a combination thereof, and do not exclude the existence of one or more other features, numerals, steps, operations, elements, components, or combinations thereof.

In the present disclosure, expressions such as "or" and the like include any and all combinations of words enumerated together. For example, "A or B" may include "A", or may include "B", or may include all of "A" and "B".

In the present disclosure, the expressions such as "first", "second", or "third" and the like may modify various elements of the present disclosure, but do not limit the corresponding elements. For example, the expressions do not limit the order of the elements or the importance thereof. The expressions may be used to distinguish one element from another element. For example, a first user device and a second user device are all user devices and represent different user devices. For example, a first element may be named as a second element without departing from the spirit and scope of the present disclosure. Furthermore, even a second element may be named a first element.

When it is mentioned that one element is "connected" or "accessed" to another element, it should be understood that the one element may be directly connected or accessed to another element or that a third element may also exist in between the two elements. In contrast, when it is mentioned that one element is "directly connected" or "directly accessed" to another element, it should be understood that the third element does not exist between the two elements.

Terms used in the present disclosure are merely used for describing specific examples and do not limit the scope of the present disclosure. Expressions of a singular number includes the expression of a plural number, unless the context clearly dictates otherwise.

Unless defined otherwise, all terms used herein, including technological or scientific terms, have the same meaning as being generally understood by a person of ordinary skill in the art. Terms as defined in a dictionary should be interpreted as having meanings consistent with the context of the related technology and should not be construed as having ideal or excessively formal meanings unless defined clearly in the present disclosure.

In accordance with aspects of the present disclosure, an electronic device may be a device that includes telecommunication. For example, the electronic device may include, but are not limited to, at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Media Player (PMP), an MPEG Audio Layer 3 (MP3) player, a mobile medical instrument, a camera, and a wearable device (e.g., a Head-Mounted Display (HMD) such as electronic glasses, electronic clothes, an electronic bracelet, an electronic necklace, an appcessory, or a smart watch).

In one example, the electronic device may be a smart home appliance equipped with telecommunication. The smart home appliance, for example, the electronic device may include, but are not limited to, at least one of a television, a Digital Video Disk (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, and an electronic frame.

In another example, the electronic device may include at least one of a variety of medical instruments (e.g., Magnetic Resonance Angiography (MRA), Magnetic Resonance Imaging (MRI), Computerized Tomography (CT), a smayning machine, an ultrasound machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, a security instrument, and an industrial or household robot.

In a further example, the electronic device may include at least one of furniture or part of a building/structure including a telecommunication function, an electronic board, an electronic signature receiving device, a projector, and various metering instruments (e.g., tap water, electricity, gas, radio wave and the like). The electronic device in accordance with the present disclosure may be one or a combination of more of the aforementioned various devices. Also, it is apparent to those skilled in the art that the electronic device in accordance with the present disclosure is not limited to the aforementioned instruments.

Figure 1B:
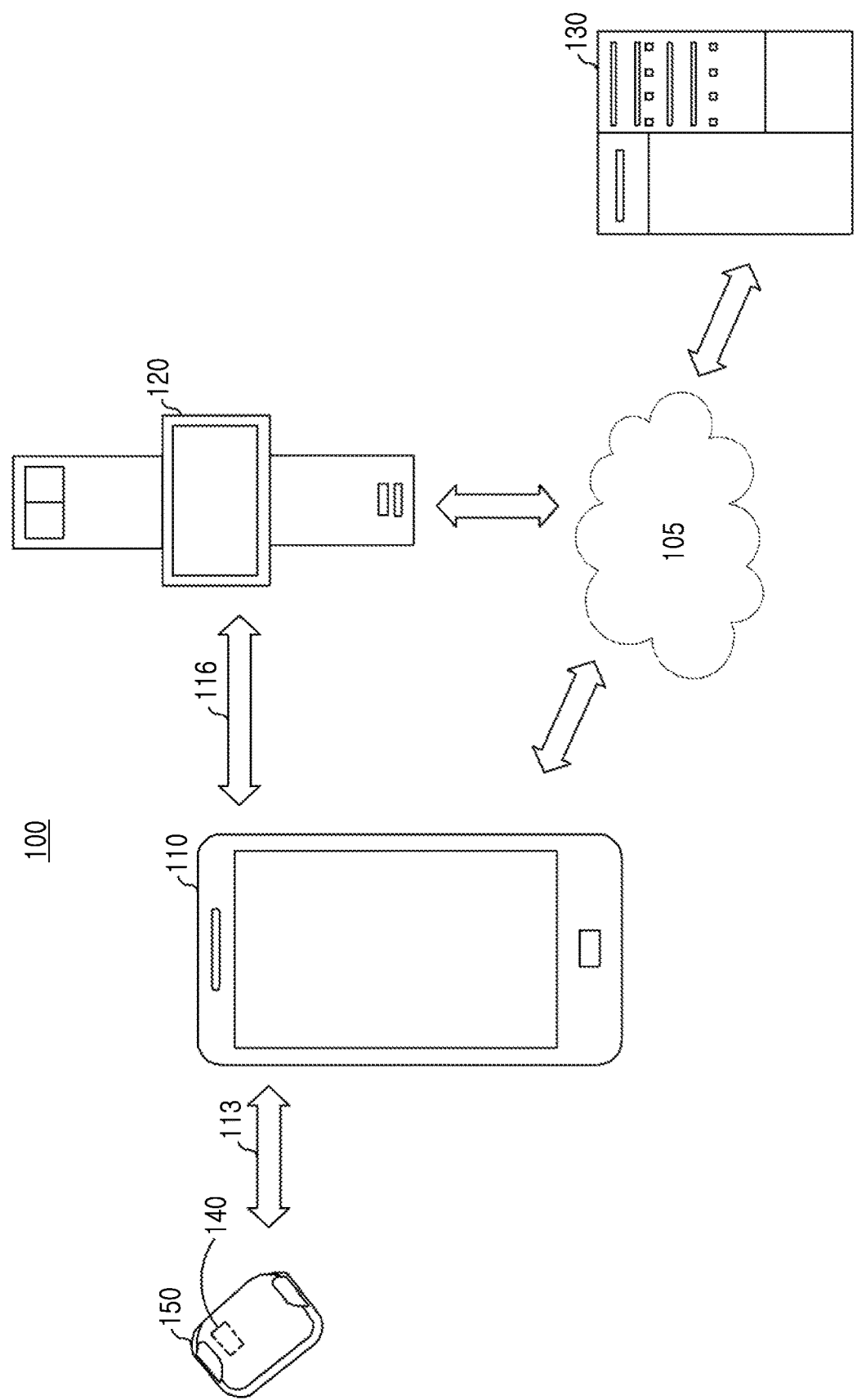

FIGS. 1A and 1B illustrate an example short-range communication protocol system. Referring to FIG. 1A, the short-range communication protocol system 100 may include a first electronic device 110 (e.g., a main electronic device), a second electronic device 120 (e.g., a sub electronic device), and a server 130 (e.g., a host). The first electronic device 110 may be, for example, a mobile device such as a portable phone or a tablet. The first electronic device 110 may obtain, for example, an address (e.g., a Media Access Control (MAC) address) of the second electronic device 120 through a first short-range communication protocol 113 (e.g., Near Field Communication (NFC)). In one example, the first short-range communication protocol 113 may be a communication protocol that supports recognition of a counterpart electronic device (e.g., the second electronic device 120). For instance, the protocol may support recognition of the counterpart device by using a simple operation such as tagging by the first electronic device 110 or sensing by the first electronic device 110 without separate authentication by the first electronic device 110. The first electronic device may receive specific information stored in the counterpart electronic device from the counterpart electronic device itself. For example, the first short-range communication protocol 113 may follow various standards such as NFC, Radio Frequency IDentification (RFID), audio synchronization, Electric Field Communication (EFC), Human Body Communication (HBC), Visible Light Communication (VLC) and the like, and is not limited to a specific communication protocol.

In the example of FIG. 1A, the counterpart electronic device of the first short-range communication protocol 113 is the second electronic device 120, but it is understood that this is merely illustrative. The counterpart electronic device of the first short-range communication protocol 113 may be, for example, an electronic device (e.g., electronic clothes or an electronic bracelet) of a type different from those shown in FIGS. 1A-B, or another entity of the same type as that of the first electronic device 110, or other examples as well.

The first electronic device 110 may, for example, establish a connection with the second electronic device 120 using a second short-range communication protocol 116 and the address of the second electronic device 120. In one example, the second short-range communication protocol 116 may be, for example, a communication protocol that supports a reliable communication channel, and that supports continuous exchange of information for synchronization of an application using the communication channel. For example, the second short-range communication protocol 116 may follow various standards such as Bluetooth (BT), Bluetooth Low Energy (BLE), Wireless Fidelity (WiFi), WiFi-direct, Wireless Giga alliance (WiGig), Ultra WideBand (UWB), Zigbee, and the like, and is not limited to a specific communication protocol.

In another example, the first electronic device 110 may generate authentication data for working in conjunction with the second electronic device 120, and authenticate the second electronic device 120 based on the generated authentication data. The authentication data of the present example may include one or more characters. The authentication data may be, for example, at least one number, at least one alphabet, at least one letter, at least one symbol, or a combination of at least two or more of the foregoing.

The authentication data generated by the first electronic device 110 may be, for example, provided to a user through an input/output device (e.g., a display) functionally connected with the first electronic device 110. If it is determined that the authentication data provided to the user through the first electronic device 110 is the same as authentication data input through the second electronic device 120, the first electronic device 110 may authenticate the second electronic device 120 as an electronic device that will work in conjunction with the first electronic device 110. In another example, the input authentication data may be input manually by the user of the first electronic device 110 or other users (e.g., a friend, a family and the like) to an input/output device (e.g., a touch screen) of the second electronic device 120.

The first electronic device 110 may, for example, obtain a location (e.g., a Uniform Resource Locator (URL)) of an application through the first short-range communication protocol 113 (e.g., NFC) with the second electronic device 120. In another example, the first electronic device 110 may be provided with the application from an external source (e.g., the server 130) corresponding to the location information of the application. The first electronic device 110 may, for example, work in conjunction with the second electronic device 120 through a second short-range communication protocol 116 (e.g., BT), and execute the provided application.

In one example, the first electronic device 110 and the second electronic device 120 each may include a momentum measurement sensor (e.g., an acceleration sensor, a gyro sensor, a geomagnetic sensor, and the like). In this instance, at least one of the first electronic device 110 and the second electronic device 120 may measure the momentum of a respective device and transmit the measured momentum to the counterparty electronic device. The first electronic device 110 and the second electronic device 120 may share the momentum information with each other. The shared momentum information may be presented by way of a visual or audible effect to a user through a first application executed in the first electronic device 110 or a second application executed in association with the first application in the second electronic device 120. As noted above, the second application executed in association with the first application may be provided from the first electronic device 110 or the external source (i.e., the server 130).

In one example, the second electronic device 120 may receive a notification of a notification event (e.g., call incoming) occurring in association with a first application (e.g., a telephony application) of the first electronic device 110, and execute a second application (e.g., a telephony application) corresponding to the notification event in the second electronic device 120. The second electronic device 120 may be the same (e.g., the same type of) device as the first electronic device 110 or a different (e.g., a different type of) device. The second electronic device 120 may be, for example, a sub electronic device capable of working in conjunction with the first electronic device 110 and performing at least some functions of the first electronic device 110 (e.g., a notification service, a telephony service, an e-mail or message (e.g., a message transmitted/received through a Short Message Service (SMS), a Multimedia Message Service (MMS), a Social Networking Service (SNS), an Instant Message (IM) service, and the like) check service, or a biological data sensing service including momentum measurement). The second electronic device 120 may be, for example, a wearable device capable of being located at a short distance from the first electronic device 110 and directly worn by a user's body, such as a smart watch, a Head-Mounted Device (HMD) such as electronic glasses, electronic clothing, an electronic bracelet, an electronic necklace, an accessory, and the like.

The second electronic device 120 may, for example, transmit/receive data required for working in conjunction with or in synchronization with the first electronic device 110, through the second short-range communication protocol 116 with the first electronic device 110. In one example, the second electronic device 120 may receive authentication data for working in conjunction with the first electronic device 110, through the second short-range communication protocol 116 from the first electronic device 110. The second electronic device 120 may work in conjunction with an application installed in the first electronic device 110 and receive an installation file of a sub application that will be executed in the second electronic device 120, from the first electronic device 110 through the second short-range communication protocol 116. The second electronic device 120 may report the installation or non-installation of the sub application executed in the second electronic device 120, an operation state thereof, the execution result thereof and the like, to the first electronic device 110 through the second short-range communication protocol 116. In a further example, the second electronic device 120 may receive synchronization information of the first electronic device 110 from the first electronic device 110 through the second short-range communication protocol 116, and may share an operation state of the application executed in the first electronic device 110, the execution result thereof, and the like with the first electronic device 110.

In addition, in accordance with the example illustrated in FIG. 1A, the second electronic device 120 may, for example, provide address information (e.g., a MAC address) of the second electronic device 120 and location information (e.g., a URL) of an application, to the first electronic device 110 through the first short-range communication protocol 113. In one example, the second electronic device 120 may include a communication tag 140 (e.g., an NFC tag) for the first short-range communication protocol 113. The communication tag 140 may include, for example, a memory storing at least one of the address information of the second electronic device 120 and the location information of the application.

The server 130 may be, for example, a device accessible by the first electronic device 110 through a network 105 (e.g., the Internet), and may store an application that works in conjunction with the first electronic device 110 and the second electronic device 120. The server 130 may be, for example, a file server, a content provider, an application market, or an application store. The location of the application obtained by first electronic device 110 may be an address of server 130.

When server 130 receives an access request from first electronic device 110, the server 130 may provide the application to the first electronic device 110 in response to the access request. For example, the server 130 may transmit an installation file of the application to the first electronic device 110. In turn, the first electronic device 110 may execute the installation file of the application and install the application.

Also, the server 130 may transmit to the first electronic device 110 an installation file of a sub application that will work in conjunction with the application. The sub application may be executed in the second electronic device 120. In this instance, the first electronic device 110 may transmit the installation file of the sub application to the second electronic device 120. In turn, the second electronic device 120 may execute the installation file of the sub application and install the sub application. In a further example, if the server 130 receives an approval from the first electronic device 110, the server 130 may transmit the sub application directly to the second electronic device 120 through the network 105.

Referring now to FIG. 1B, the short-range communication protocol system 100 may further include a third electronic device 150 in addition to the first electronic device 110, the second electronic device 120, and the server 130 which are the elements illustrated in FIG. 1A. The third electronic device 150 may, for example, function as a counterpart electronic device of the first short-range communication protocol 113 for the first electronic device 110. The third electronic device 150 may, for example, provide address information (e.g., a MAC address) of the second electronic device 120 and location information (e.g., a URL) of an application to the first electronic device 110, through the first short-range communication protocol 113. In one example, the third electronic device 150 may include a communication tag 140 (e.g., an NFC tag) for the first short-range communication protocol 113. The communication tag 140 may include, for example, a memory storing at least one of the address information of the second electronic device 120 and the location information of the application.

The third electronic device 150 may be the same (e.g., the same type of) device as the first electronic device 110 or the second electronic device 120 or a different (e.g., a different type of) device. In one example, the third electronic device 150 may be a peripheral device (e.g., a docking station, an electric charger and the like) having a structure physically attachable or detachable from the first electronic device 110 or the second electronic device 120. Alternatively, the third electronic device 150 may, for example, perform a partial function of at least one of the first electronic device 110 and the second electronic device 120, or supply a power source to the at least one of the first electronic device 110 and the second electronic device 120 through a wired/wireless connection with the at least one of the first electronic device 110 and the second electronic device 120.

Figure 2:
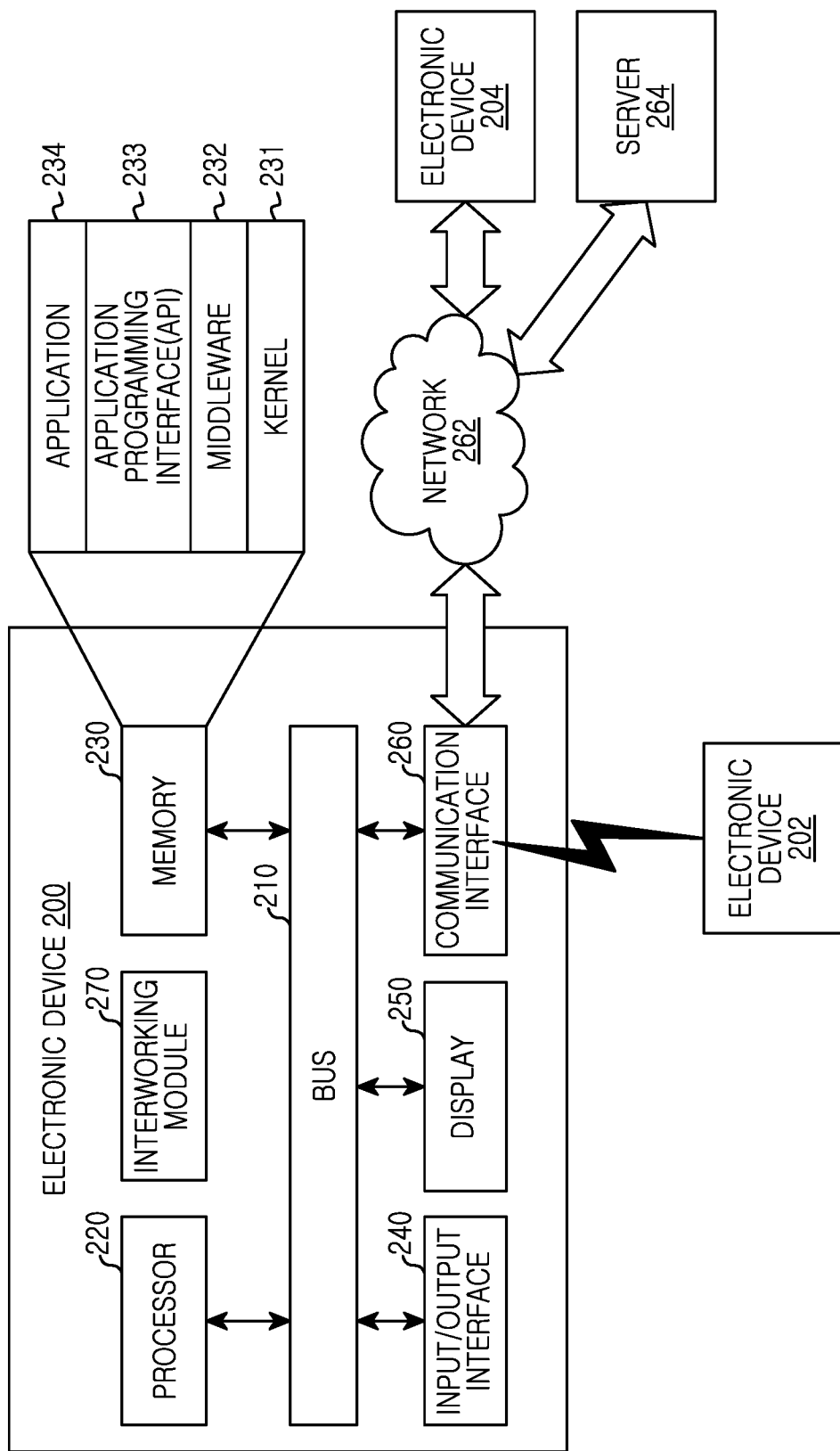
FIG. 2 is a block diagram illustrating an example electronic device in accordance with aspects of the present disclosure.

Referring now to FIG. 2, an example electronic device 200 is shown. The electronic device 200 may be, for example, a first electronic device 110 illustrated in FIG. 1. Electronic device 200 may include a bus 210, a processor 220, a memory 230, an input/output interface 240, a display 250, a communication interface 260, and an interworking module 270.

The bus 210 may be a circuit connecting the aforementioned elements with each other, and forwarding a communication signal (e.g., a control message) between the aforementioned elements.

The processor 220 may, for example, receive instructions from the aforementioned other elements (e.g., the memory 230, the input/output interface 240, the display 250, the communication interface 260, the interworking module 270, and the like) through the bus 210, decipher the received instructions, and execute the deciphered instructions.

The memory 230 may store instructions or data which are received from the processor 220 or the other elements (e.g., the input/output interface 240, the display 250, the communication interface 260, the interworking module 270, and the like) or are generated by the processor 220 or the other elements. The memory 230 may, for example, include programming modules such as a kernel 231, a middleware 232, an Application Programming Interface (API) 233, an application 234 or the like. The aforementioned respective programming modules may be composed of software, firmware, hardware or a combination of at least two or more of them.

The kernel 231 may control or manage system resources (e.g., the bus 210, the processor 220, the memory 230, the interworking module 270, and the like) used for executing operations or functions implemented in the remnant other programming modules, for example, the middleware 232, the API 233, and the application 234. Also, the kernel 231 may provide an interface of enabling the middleware 232, the API 233, or the application 234 to access and control or manage an individual element of the electronic device 200.

The middleware 232 may perform a relay role such that the API 233 or the application 234 may communicate with the kernel 231 and exchange data with the kernel 231. Also, in relation with work requests received from the (plurality of) applications 234, the middleware 232 may, for example, perform a control (e.g., scheduling or load balancing) of the work request using a method of allotting the order of priority for using the system resource (e.g., the bus 210, the processor 220, the memory 230, the interworking module 270 or the like) of the electronic device 200 to at least one application among the (plurality of) applications 234.

The API 233, which is an interface for enabling the application 234 to control a function provided in the kernel 231 or the middleware 232, may include, for example, at least one interface or function (e.g., an instruction) for file control, window control, image processing, character control or the like.

The input/output interface 240 may receive an input of an instruction or data from a user and deliver the received instruction or data to the processor 220, the memory 230, the interworking module 270, and the like through the bus 210. Also, the input/output interface 240 may output audio information received from the interworking module 270, the memory 230 or the communication interface 260 through the bus 210.

The display 250 may display an image, a picture, data or the like to a user. The communication interface 260 may connect communication between the electronic device 200 and one or more other electronic devices 202. The communication interface 260 may support a predetermined short-range communication protocol (e.g., WiFi, WiFi-direct, WiGig, BT, BLE, Zigbee, UWB, NFC, RFID, audio synchronization, EFC, HBC, VLC and the like) or predetermined network communication 262 (e.g., the Internet, a Local Area Network (LAN), a Wide Area Network (WAN), a telecommunication network, a cellular network, a satellite network, a Plain Old Telephone System (POTS) or the like). The electronic devices 202 and 204 each may be the same (e.g., same type of) device as the electronic device 200 or be a different (e.g., different type of) device. Server 264 may be a host computer for storing applications and me be any type of device or computer.

The interworking module 270 may process at least part of digital information obtained from the other elements (e.g., the processor 220, the memory 230, the input/output interface 240, the communication interface 260, and the like), and provide the digital information to a user in various methods. The interworking module 270 may, for example, control at least some functions of the electronic device 200 by using the processor 220 such that the electronic device 200 works in conjunction with other electronic devices. Additional details regarding interworking module 270 is discussed below with reference to FIGS. 3-7.

Figure 3:
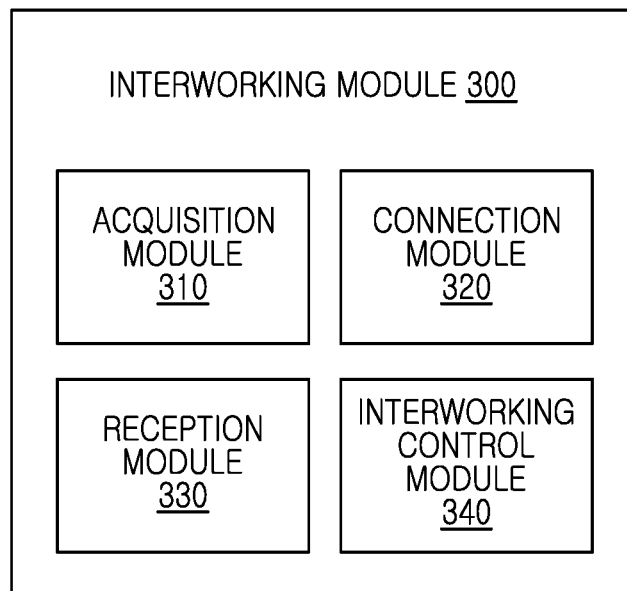
FIG. 3 is a block diagram illustrating an example interworking module of an electronic device in accordance with aspects of the present disclosure.

FIG. 3 illustrates an example interworking module 300 of an electronic device (e.g., the first electronic device 110) in accordance with aspects of the present disclosure. The interworking module 300 may be, for example, the interworking module 270 illustrated in FIG. 2. Referring to FIG. 3, the interworking module 300 may include an acquisition module 310, a connection module 320, a reception module 330, and an interworking control module 340.

The acquisition module 310 may, for example, obtain telecommunication address information of a sub electronic device (e.g., the second electronic device 120) and location information of one or more applications to be executed in conjunction with at least the sub electronic device (e.g., the second electronic device 120). The address and location may be obtained using first short-range communication protocol 113 with the external device (e.g., the second electronic device 120 or the third electronic device 150). In one example, the acquisition module 310 may obtain address information (e.g., a MAC address) of the sub electronic device (e.g., the second electronic device 120) and location information (e.g., a URL) of at least an application, from the sub electronic device (e.g., the second electronic device 120), the sub electronic device being a counterpart device of the first short-range communication protocol (e.g., 113 of FIG. 1). In one example, the acquisition module 310 may obtain the address information (e.g., the MAC address) of the sub electronic device (e.g., the second electronic device 120) and the location information (e.g., the URL) of at least the application, from some other electronic device (e.g., the third electronic device 150), the other electronic device being a counterpart device of the first short-range communication protocol (e.g., 113 of FIG. 1).

The connection module 320 may, for example, connect the second short-range communication protocol (e.g., 116 of FIG. 1) with the sub electronic device (e.g., the second electronic device 120), using the telecommunication address information of the sub electronic device (e.g., the second electronic device 120). In one example, the connection module 320 may authenticate the sub electronic device (e.g., the second electronic device 120), as a counterpart electronic device that will generate authentication data. The authentication data may allow the electronic device (e.g., the first electronic device 110) to work in conjunction with the sub electronic device (e.g. the second electronic device 120). For example, the connection module 320 may display the authentication data to a user, through a display functionally connected with the electronic device (e.g., the first electronic device 110). Also, the connection module 320 may present a request of inputting the authentication data through the sub electronic device (e.g., the second electronic device 120), to the user by using a visual or audible effect.

If the generated authentication data and the authentication data input in the sub electronic device (e.g., the second electronic device 120) are consistent with each other, for example, the connection module 320 may authenticate the sub electronic device (e.g., the second electronic device 120). Comparing the authentication data generated in the connection module 320 and the authentication data input through the sub electronic device (e.g., the second electronic device 120) may be performed by connection module 320 or some other module (e.g., the interworking control module 340) functionally connected with the connection module 320, or may be performed in the sub electronic device (e.g., the second electronic device 120).

In one example, the first electronic device 110 and the second electronic device 120 may each include a biological recognition sensor (e.g., a fingerprint recognition sensor, an iris recognition sensor, a voice recognition sensor, a face recognition sensor and the like). In this instance, the second electronic device 120 may receive an input of user's biological information (e.g., fingerprint information, iris information, voice information, face information or the like) from a user and transmit the user's biological information to the first electronic device 110. The first electronic device 110 (e.g., the connection module 320) may compare the received user's biological information with the biological information stored (e.g., previously inputted and stored, or received from the server 130) in the first electronic device 110. If they match, the first electronic device 110 may authenticate a user as an authorized user of the second electronic device 120. The biological information may be transmitted together with the authentication data comparison result or may be transmitted separately (e.g., before or after the authentication data transmission). If transmitted concurrently, the biological information may be transmitted as separate data distinguishable from the authentication data comparison result or may be transmitted in a form in which at least part of the biological information is coupled with at least part of the authentication data comparison result. For example, the second electronic device 120 may code at least the part of the biological information using a hash function, and couple the coded biological information to be interleaved with at least part of the authentication data, and transmit the interleaving result to the first electronic device 110. However, it is understood that the foregoing are merely examples and that many forms of transmission may be implemented. For example, the first electronic device 110 may receive an input of user's biological information (e.g., fingerprint information, iris information, voice information, face information and the like) from a user and transmit the biological information to the second electronic device 120; in turn, the second electronic device 120 may compare the received user's biological information with biological information existing (e.g., previously inputted and stored, or received from the server 130) in the second electronic device 120.

The reception module 330 may be, for example, provided with an application from an external server (e.g., the server 130). The external server may be the location of the application. In one example, the reception module 330 may receive an installation file of the application from the external server (e.g., the server 130), and execute the installation file of the application, and install the application. Alternatively, the installation file of the application may include installation files of not only an application to be executed in conjunction with interworking control module 340 described later but also a sub application that will work in conjunction with this application and be executed in the sub electronic device (e.g., the second electronic device 120).

The interworking control module 340 may, for example, work in conjunction with the sub electronic device (e.g., the second electronic device 120) through the second short-range communication protocol (e.g., 116 of FIG. 1), and execute an application. The interworking control module 340 may transmit an installation file of a sub application to the sub electronic device (e.g., the second electronic device 120), through the second short-range communication protocol (e.g., 116 of FIG. 1). The interworking control module 340 may execute a management application and perform at least one of an operation of monitoring an operation state of another application installed in the sub electronic device and an operation of providing a user with a warning message in response to a request of removal of one or more applications. The management application is discussed further below with reference to FIG. 6.

An electronic device may include at least one processor to obtain an address of an external electronic device and a location of an application, the address and the location being obtained using a first short-range communication protocol; establish a connection with the external device using a second short-range communication protocol and the address of the external electronic device; obtain the application from the location of the application; and execute the application in conjunction with the external electronic device using the second short-range communication protocol. The first short-range communication protocol may include at least one of NFC with an external tag, RFID, audio synchronization, EFC, HBC, and VLC. The second short-range communication protocol may include at least one of BT, BLE, Zigbee, UWB, WiFi, WiFi-direct, and WiGig.

In one aspect, at least one processor may obtain the address and the location from the external electronic device using the first short-range communication protocol. In another aspect, at least one processor may obtain the address and the location from some other electronic device using the first short-range communication protocol. In this instance, the other electronic device may be physically attachable and detachable from the electronic device or the external electronic device; alternatively, such other device may supply a power source to the electronic device or the external electronic device.

In yet another aspect, at least one processor may generate authentication data; display the authentication data on a display of the electronic device; detect receipt of additional authentication data from the external electronic device; and authenticate the external electronic device based on a comparison between the generated authentication data and the additional authentication data.

In another example, at least one processor may detect receipt of an installation file of the application from an external server and install the application. In another aspect at least one processor may detect a sub-application installation file in the installation file; and transmit the sub-application installation file to the external electronic device using the second short-range communication protocol. The sub-application installation file may include a sub-application that works in conjunction with the application.

In another example, at least one processor may execute a management application included in the application; and perform at least one of monitoring an operation state of another application installed in the external electronic device and providing a warning message to a user in response to a request for removal of the application.

Figure 4:
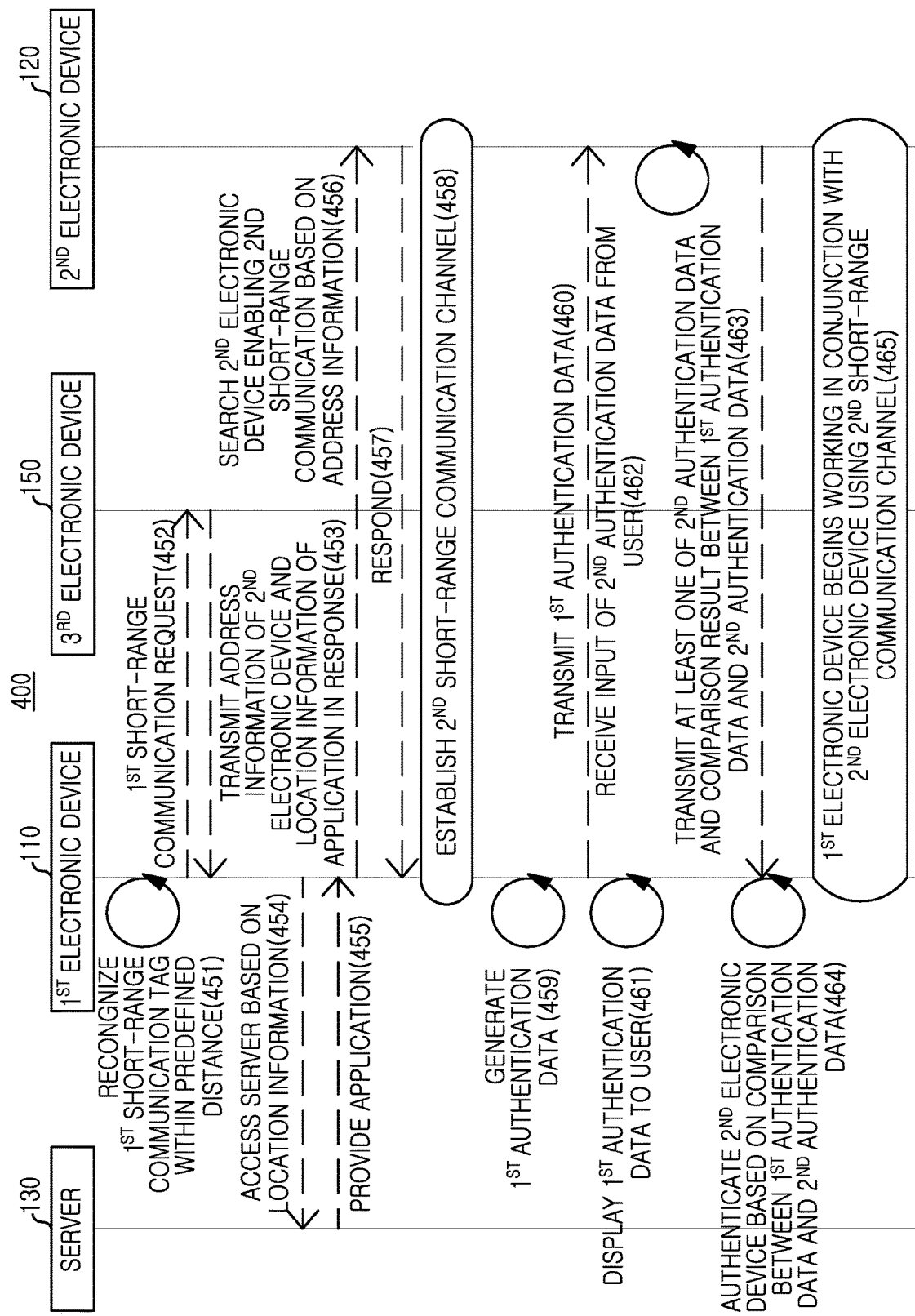
FIG. 4 is a ladder diagram illustrating an example process in accordance with aspects of the present disclosure.

FIG. 4 illustrates an example method 400 of a plurality of electronic devices (e.g., the first electronic device 110, the second electronic device 120, the third electronic device 150, and the server 130) working in conjunction using a short-range communication protocol (e.g., the first short-range communication protocol 113 or the second short-range communication protocol 116).

Referring to FIG. 4, in operation 451, the first electronic device 110 (e.g., the acquisition module 310) may recognize a first short-range communication protocol (e.g., 113 of FIG. 1) tag installed in the third electronic device 150 being within a designated (e.g., predefined) distance (e.g., about 10 cm). In operation 452, the first electronic device 110 (e.g., the acquisition module 310) may send a first short-range communication protocol request to the third electronic device 150. In response to the first short-range communication protocol request, in operation 453, the third electronic device 150 may transmit address information (e.g., a MAC address) of the second electronic device 120 and location information (e.g., a URL) of an application to the first electronic device 110. In operation 454, the location may be the location of server 130 and first electronic device 110 (e.g., the reception module 330) may gain access to the server 130 in operation 454, and send an application provision request to the server 130. In response to the application provision request of operation 454, in operation 455, the server 130 may provide an application to the first electronic device 110.

In operation 456, the first electronic device 110 (e.g., the connection module 320) may, for example, search the second electronic device 120 based on the address information obtained in operation 453. In operation 457, the second electronic device 120 may send the first electronic device 110 a response to the search of operation 456. In operation 458, the first electronic device 110 (e.g., the connection module 320) may establish a second short-range communication protocol channel with the second electronic device 120.

In operation 459, the first electronic device 110 (e.g., the connection module 320) may generate first authentication data that allows first electronic device 110 to work in conjunction with second electronic device 120. In operation 460, the first electronic device 110 (e.g. the connection module 320) may, for example, transmit the first authentication data generated in operation 459, to the second electronic device 120 through the second short-range communication protocol channel established in operation 458. In operation 461, the first electronic device 110 (e.g., the connection module 320) may present the first authentication data to a user through a display (e.g., 250 of FIG. 2) functionally connected to the first electronic device 110. In one example, concurrently with display of the first authentication data, the first electronic device 110 (e.g., the connection module 320) may present (e.g., display) a prompt to input second authentication data on a display of second electronic device 120.

In operation 462, the second electronic device 120 may, for example, receive an input of the second authentication data from a user. In operation 463, the second electronic device 120 may, for example, transmit at least one of the second authentication data and the comparison result between the first authentication data and the second authentication data, to the first electronic device 110 through the second short-range communication protocol channel. In one example, a comparison of the first authentication data and the second authentication data may be carried out in at least one of the first electronic device 110 and the second electronic device 120. In one example, the second electronic device 120 may compare the first authentication data and the second authentication data and identify whether both authentication data are consistent with each other. In another example, the first electronic device 110 (e.g., the connection module 320) may receive the second authentication data through the second short-range communication protocol channel, and compare the first authentication data and the second authentication data, and identify whether both authentication data are consistent with each other.

In operation 464, the first electronic device 110 (e.g., the connection module 320) may, for example, authenticate the second electronic device 120 as the device that will work in conjunction with the first electronic device 110, based on the comparison between the first authentication data and the second authentication data. In operation 465, when authentication of the second electronic device 120 is successful, in operation 464, the first electronic device 110 may begin working in conjunction with second electronic device 120 through the second short-range communication protocol channel. It is understood that the operations shown in FIG. 4 may be performed in a different order or concurrently and that other operations may be added or omitted.

Figure 5:
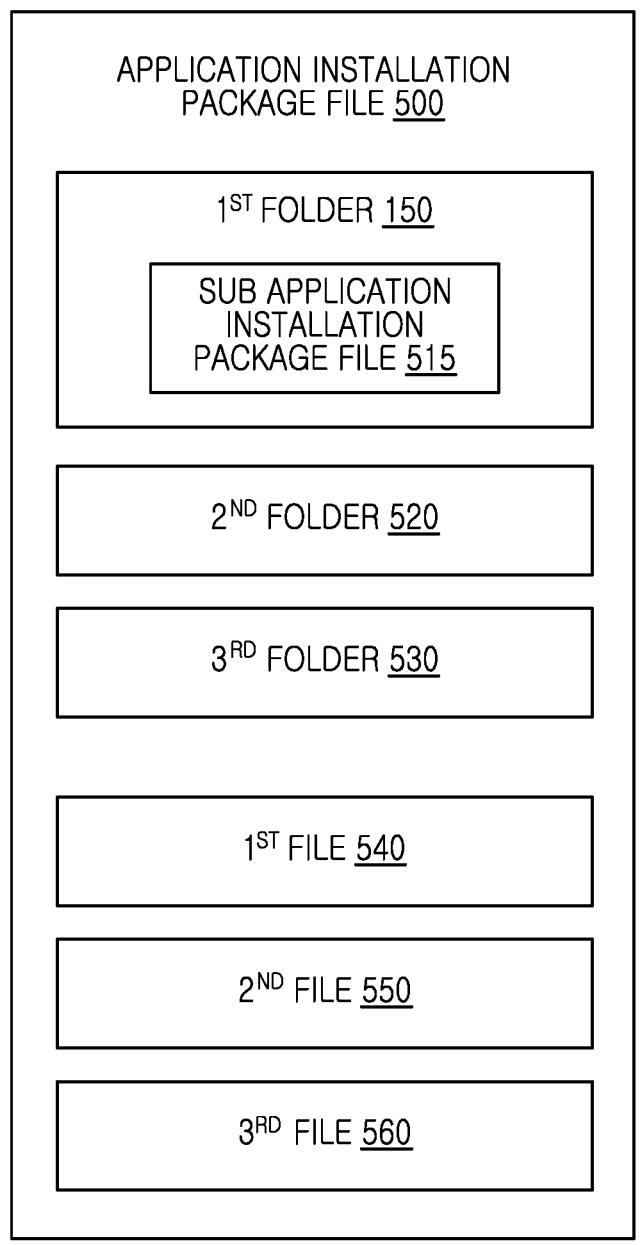
FIG. 5 is a diagram illustrating an example installation package in accordance with aspects of the present disclosure.

Referring to FIG. 5, an example installation package file 500 is shown. Installation package file 500 of the application may include one or more folders such as a first folder 510, a second folder 520, and a third folder 530, and one or more files such as a first file 540, a second file 550, and a third file 560.

The first folder 510 may be, for example, a folder storing data associated with an external resource of an application, or a software program. The first folder 510 may be, for example, an "asset" folder of an Application PacKage (APK) file of Android operating system. In a further example, an installation package file of an application for working in conjunction with another device (e.g., the second electronic device 120) may include an installation package file 515 of a sub application that will work in conjunction with the application and be executed in another device (e.g., the second electronic device 120). In another example, as illustrated in FIG. 5, the installation package file 515 of the sub application may be located in the first folder 510 of the installation package file 500 of the application. However, it is understood that FIG. 5 is merely illustrative and that the installation package file 515 of the sub application may be located in another folder of the installation package file 500 or some other location.

The second folder 520 may, for example, store metadata of the application itself. The metadata may include content for generating a digital signature through a certificate of authentication. The second folder 520 may be, for example, a "META INF" folder of the APK file of an Android operating system. The third folder 530 may be, for example, a folder storing data regarding an internal resource of the application or a software program. The third folder 530 may be, for example, a "META-INF" folder of the APK file of the Android operating system.

The first file 540 is, for example, a file storing basic setup information of the application. The first file 540 may be, for example, "AndroidManifest.xml" of an Android operating system. The second file 550 may be, for example, a file generated by compiling a source code of the application and may include information of classes associated with an operation of the application. The second file 550 may be, for example, "classes.dex" of an Android operating system. The third file 560 may include, for example, resources previously compiled before execution of the application. The third file 560 may be, for example, "resources.arsc" of an Android operating system.

Figure 6:
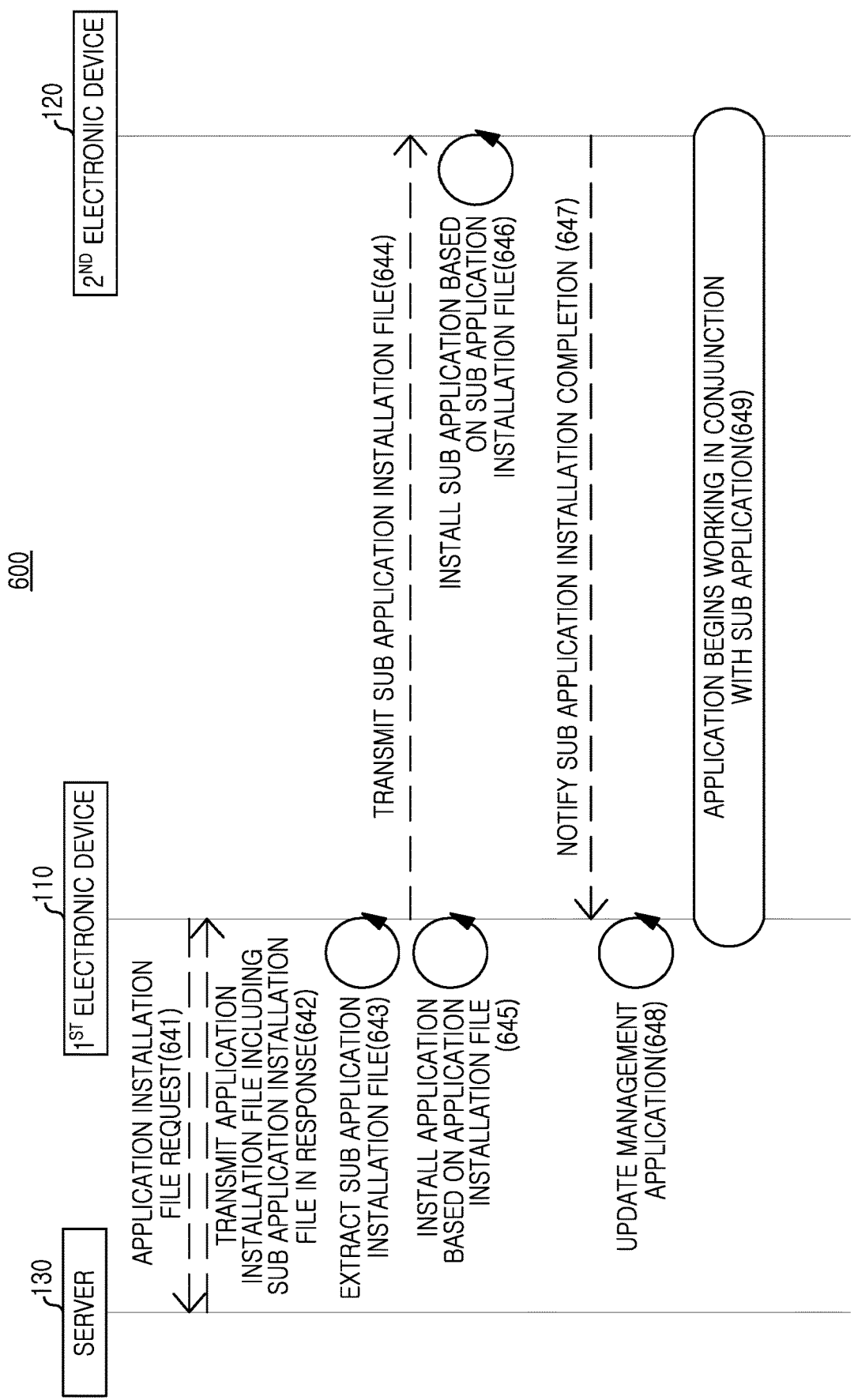
FIG. 6 is a ladder diagram illustrating an example process of installing an application in accordance with aspects of the present disclosure.

Referring to FIG. 6, an example method 600 of installing an application is shown. At operation 641, the first electronic device 110 (e.g., the reception module 330) may request an installation package file (e.g., installation package file 500) to the server 130. In response to the request of operation 641, in operation 642, the server 130 may transmit the application installation file to the first electronic device 110. In one example, the application installation file may include a sub application installation file (e.g., the sub application installation file 515).

In operation 643, the first electronic device 110 (e.g., the interworking control module 340) may, for example, extract the sub application installation file (e.g., the sub application installation file 515) from the application installation file (e.g., installation package file 500). In operation 644, the first electronic device 110 (e.g., the interworking control module 340) may, for example, transmit the sub application installation file extracted in operation 643 to the second electronic device 120 through the second short-range communication protocol (e.g., 116 of FIG. 1). In operation 645, the first electronic device 110 (e.g., the interworking control module 340) may, for example, install the application from the installation file received at operation 642. In operation 646, the second electronic device 120 may install the sub application from the sub application installation file. In operation 647, the second electronic device 120 may notify the first electronic device 110 that the installation of the sub application has been completed using the second short-range communication protocol (e.g., 116 of FIG. 1). At operation 648, the first electronic device 110 may update the management application. At operation 649, the application installed in first electronic device 110 may begin working in conjunction with the sub application installed in second electronic device 120. As with the example of FIG. 4, the operations in FIG. 6 may be performed in a different order or concurrently and operations may be added or omitted.

In one example, one or more applications that the first electronic device 110 receives from the server 130 may include a management application. The management application may perform a function of storing a list of sub applications installed in another device (e.g., the second electronic device 120) that is working in conjunction with the first electronic device 110. The management application may also monitoring the operation states of the sub applications. In a further example, the management application may update the versions of the sub applications from server 130.

In one example, when the management application receives a request for removal of an application working in conjunction with a sub application, the management application may display a warning that the sub application would not operate normally if the application is removed from first electronic device 110.

Figure 7:
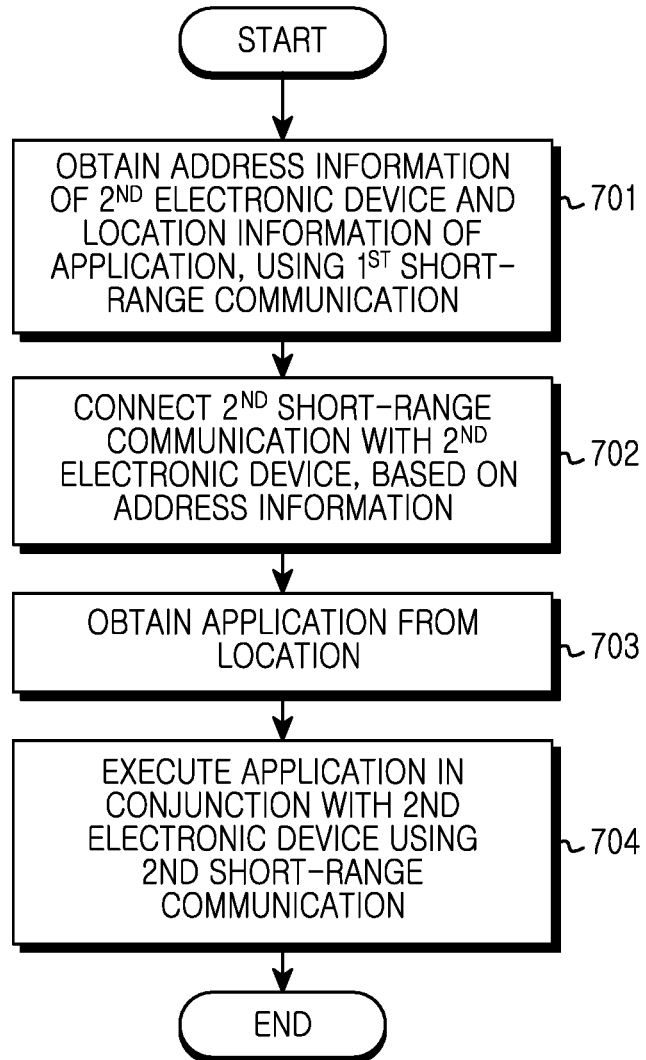
FIG. 7 is a flowchart illustrating an example method in accordance with aspects of the present disclosure.

Referring now to FIG. 7, a flowchart illustrating an example method 700 is shown. In operation 701, the first electronic device 110 (e.g., the acquisition module 310) may obtain address information of the second electronic device 120 and location information of an application. The application may be capable of working in conjunction with at least second electronic device 120. The address of the second electronic device 120 and the location information may be obtained from some external device (e.g., the second electronic device 120 or the third electronic device 150) using a first short-range communication protocol. In operation 702, the first electronic device 110 (e.g., the connection module 320) may connect with the second electronic device 120 using a second short-range communication protocol and the address information. In operation 703, the first electronic device 110 (e.g., the reception module 330) may obtain the application from the location, which may be the external device (e.g., the server 130). In operation 704, the first electronic device 110 (e.g., the interworking control module 340) may begin to execute the application in conjunction with the second electronic device 120. The operations shown in FIG. 7 may also be performed in a different order or concurrently and operations may be added or omitted. The operations may also be executed using a heuristic method.

In another example, a method of working in conjunction with a plurality of electronic devices may include obtaining an address of a second electronic device and a location of an application, the address and the location being obtained using a first short-range communication protocol; establishing a connection with the second electronic device using a second short-range communication protocol and the address of the second electronic device; obtaining the application from the location of the application; and executing the application in conjunction with the second electronic device using the second short-range communication protocol.

In another aspect, obtaining the address of the second electronic device and the location of the application may further comprise obtaining the address and the location from the second electronic device using the first short-range communication protocol. However, the address of the second electronic device and the location of the application may further comprise obtaining the address and the location from a third electronic device different from the first electronic device and the second electronic device.

In a further aspect, establishing a connection with the second electronic device may further comprise: generating first authentication data; displaying the first authentication data on a display of the first electronic device; detecting receipt of second authentication data from the second electronic device; and authenticating the second electronic device based on a comparison between the first authentication data and the second authentication data.

In yet a further aspect, authenticating the second electronic device may further include transmitting the first authentication data to the second electronic device; and detecting, from the second electronic device, receipt of a result of the comparison between the first authentication data and the second authentication data.

In a further example, the method may comprise authenticating a user of the second electronic device using biological information. The method may also comprise: receiving the biological information from the second electronic device; and comparing the biological information with biological information stored in the first electronic device. In another example, at least part of the biological information received from the second electronic device is interleaved with at least part of the comparison between the first authentication data and the second authentication data.

Figure 8:
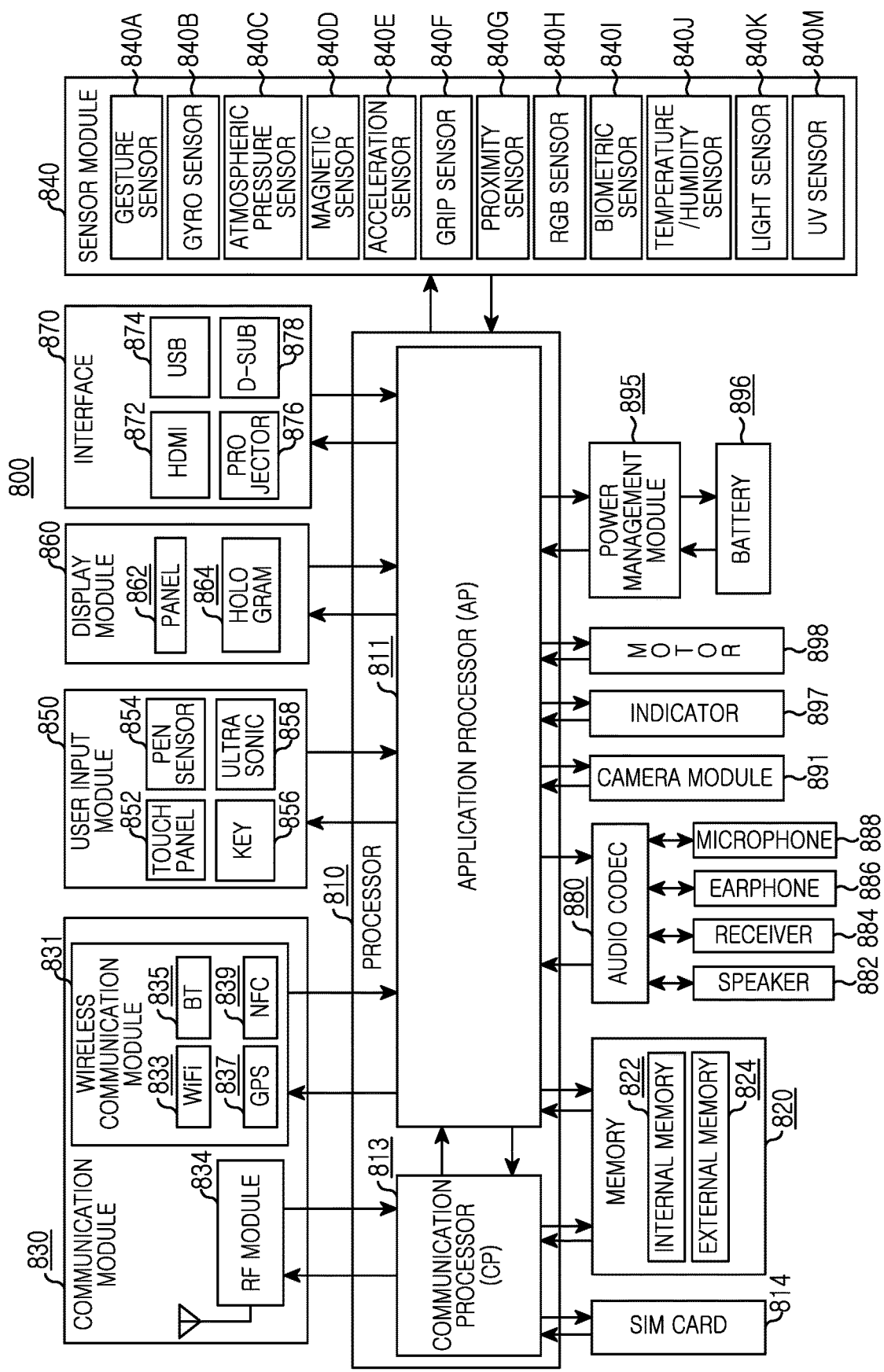
FIG. 8 is a block diagram illustrating an example of hardware in accordance with aspects of the present disclosure.

FIG. 8 is a block diagram illustrating an example hardware in accordance with aspects of the present disclosure. The hardware 800 may be, for example, the electronic device 200 illustrated in FIG. 2. Referring to FIG. 8, the hardware 800 include one or more processors 810, a Subscriber Identification Module (SIM) card 814, a memory 820, a communication module 830, a sensor module 840, a user input module 850, a display module 860, an interface 870, an audio codec 880, a camera module 891, a power management module 895, a battery 896, an indicator 897, and a motor 898.

The processor 810 (e.g., the processor 220) may include one or more Application Processors (APs) 811 or one or more Communication Processors (CPs) 813. The processor 810 may be, for example, the processor 220 illustrated in FIG. 2. Although FIG. 8 illustrates that the AP 811 and the CP 813 are included within the processor 810, the AP 811 and the CP 813 may be included within different IC packages, respectively. In one example, the AP 811 and the CP 813 may be included within one IC package.

The AP 811 may drive an operating system or an application program and control a plurality of hardware or software elements connected to the AP 811, and perform processing and operation of various data including multimedia data. The AP 811 may be, for example, implemented as a System on Chip (SoC). In another example, the processor 810 may further include a Graphic Processing Unit (GPU) (not shown).

The CP 813 may perform a function of managing a data link and converting a communication protocol in communication between an electronic device (e.g., the electronic device 200) including the hardware 800 and other electronic devices connected through a network. The CP 813 may be implemented as a SoC, for example. In a further example, the CP 813 may perform at least part of a multimedia control function. The CP 813 may, for example, perform the distinction and authentication of the electronic device within a communication network, using a subscriber identity module (e.g., the SIM card 814). Also, the CP 813 may provide services such as voice telephony, video telephony, a text message, packet data or the like to a user.

Also, the CP 813 may control data transmission/reception of the communication module 830. Although FIG. 8 illustrates the elements such as the CP 813, the power management module 895, the memory 820 and the like as elements separate from the AP 811, In one example, the AP 811 may be implemented to include at least some (e.g., the CP 813) of the aforementioned elements.

In a further example, the AP 811 or the CP 813 may load to a volatile memory an instruction or data received from a non-volatile memory connected to each of the AP 811 and the CP 813 or from at least one of other elements, and process the loaded instruction or data. Also, the AP 811 or the CP 813 may store in the non-volatile memory data received from at least one of the other elements or generated by at least one of the other elements.

The SIM card 814 may be a card implementing the subscriber identity module, and may be inserted into a slot provided in a specific location of the electronic device. The SIM card 814 may include unique identification information (e.g., Integrated Circuit Card ID (ICCID)) or subscriber information (e.g., International Mobile Subscriber Identity (IMSI)).

The memory 820 may include an internal memory 822 or an external memory 824. The memory 820 may be, for example, the memory 230 illustrated in FIG. 2. The internal memory 822 may include, for example, at least one of a volatile memory (e.g., a Dynamic Random Access Memory (DRAM), a Static Random Access Memory (SRAM), a Synchronous Dynamic Random Access Memory (SDRAM) and the like) or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like). In one example, the internal memory 822 may take a form of Solid State Drive (SSD). The external memory 824 may further include a flash drive, for example, Compact Flash (CF), Secure Digital (SD), Micro Secure Digital (Micro-SD), Mini Secure Digital (Mini-SD), extreme Digital (xD), a memory stick or the like.

The communication module 830 may include a wireless communication module 831 or a Radio Frequency (RF) module 834. The communication module 830 may be, for example, the communication interface 260 illustrated in FIG. 2. The wireless communication module 831 may include, for example, WiFi 833, BT 835, GPS 837, and NFC 839. For example, the wireless communication module 831 may provide a wireless communication function using radio frequency. Alternatively, the wireless communication module 831 may include a network interface (e.g., a LAN card), a modem or the like for connecting the hardware 800 with a network (e.g., the Internet, a LAN, a WAN, a telecommunication network, a cellular network, a satellite network, a POTS or the like).

The RF module 834 may take charge of transmission/reception of data, for example, transmission/reception of an RF signal or a called electronic signal. The RF module 834 may include, though not illustrated, for example, a transceiver, a Power Amp Module (PAM), a frequency filter, a Low Noise Amplifier (LNA) and the like. Also, the RF module 834 may further include a component for transmitting/receiving an electromagnetic wave on a free space in a wireless communication, for example, a conductor, a conductive line and the like.

The sensor module 840 may include, for example, at least one of a gesture sensor 840A, a gyro sensor 840B, an air pressure sensor 840C, a magnetic sensor 840D, an acceleration sensor 840E, a grip sensor 840F, a proximity sensor 840G, a Red, Green, Blue (RGB) sensor 840H, a biological sensor 840I, a temperature/humidity sensor 840J, a light sensor 840K, and a Ultraviolet (UV) sensor 840M. The sensor module 840 may measure a physical quantity or sense an activation state of the electronic device and convert the measured or sensed information into an electrical signal. Alternatively, the sensor module 840 may include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown) and the like. The sensor module 840 may further include a control circuit for controlling at least one or more sensors provided therein.

The user input module 850 may include a touch panel 852, a (digital) pen sensor 854, a key 856, or an ultrasonic input device 858. The user input module 850 may be, for example, the input/output interface 240 illustrated in FIG. 2. The touch panel 852 may recognize, for example, a touch input in at least one method among a capacitive method, a pressure sensitive method, an infrared method, and an ultrasonic method. Also, the touch panel 852 may also further include a controller (not shown). In the capacitive method, not only direct touch but also proximity recognition is possible. The touch panel 852 may also further include a tactile layer. In this instance, the touch panel 852 may provide a tactile response to a user.

The (digital) pen sensor 854 may be implemented, for example, using the same or similar method with receiving a user's touch input or a separate sheet for recognition. The key 856 may be, for example, a keypad or a touch key. The ultrasonic input device 858 is a device capable of confirming data by sensing a sound wave with a microphone (e.g., a microphone 888) of the electronic device, and may perform wireless recognition through a pen generating an ultrasonic signal. In another example, the hardware 800 may also receive a user input from an external device (e.g., a network, a computer, or a server) connected to the hardware 800 using the communication module 830.

The display module 860 may include a panel 862 or a hologram 864. The display module 860 may be, for example, the display 250 illustrated in FIG. 2. The panel 862 may be, for example, a Liquid Crystal Display (LCD), an Active-Matrix Organic Light-Emitting Diode (AMOLED), or the like. The panel 862 may be implemented to be flexible, transparent, or wearable, for example. The panel 862 may be also constructed as one module together with the touch panel 852. The hologram 864 may show a three-dimensional image in the air by using interference of light. In one example, the display module 860 may further include a control circuit for controlling the panel 862 or the hologram 864.

The interface 870 may include, for example, a High-Definition Multimedia Interface (HDMI) 872, a Universal Serial Bus (USB) 874, a projector 876, and a D-subminiature (D-sub) 878. Alternatively, the interface 870 may include, for example, Secure Digital/Multi Media Card (SD/MMC) (not shown) and Infrared Data Association (IrDA) (not shown).

The audio codec 880 may convert a voice and an electric signal interactively. The audio codec 880 may convert, for example, voice information that is inputted or outputted through a speaker 882, a receiver 884, an earphone 886, the microphone 888 and the like.

The camera module 891 is a device capable of taking an image and a video. In a further example, the camera module 891 may include one or more image sensors (e.g., a front lens and a rear lens), an Image Signal Processor (ISP) (not shown), and a flash LED (not shown).

The power management module 895 may manage power of the hardware 800. Though not illustrated, the power management module 895 may include, for example, a Power Management Integrated Circuit (PMIC), a charger Integrated Circuit (IC), and a battery gauge.

The PMIC may be mounted, for example, within an integrated circuit or a SoC semiconductor. A charging method may be divided into wired and wireless. The charger IC may charge a battery, and may prevent the inflow of overvoltage or overcurrent from an electric charger. In another example, the charger IC may include a charger IC for at least one of a wired charging method and a wireless charging method. As the wireless charging method, there are a magnetic resonance method, a magnetic induction method, an electromagnetic method and the like, for example. The charger IC may be added with additional circuits for wireless charging, for example, a coil loop, a resonance circuit, a rectifier circuit and the like.

The battery gauge may measure, for example, a level of the battery 896, a voltage in charging, an electric current, and a temperature. The battery 896 may generate electricity and supply a power source. The battery 896 may be, for example, a rechargeable cell.

The indicator 897 may display a specific state of the hardware 800 or a part (e.g., the AP 811) thereof, for example, a booting state, a message state, a charging state and the like. The motor 898 may convert an electrical signal into a mechanical vibration.

Though not illustrated, the hardware 800 may include a processing device (e.g., a GPU) for mobile TV support. The processing device for mobile TV support may process, for example, standard media data of Digital Multimedia Broadcasting (DMB), Digital Video Broadcasting (DVB), a media flow and the like. The aforementioned elements of the hardware 800 in accordance with the present disclosure may be constructed by one or more components, and the names of the corresponding elements may be varied in accordance with the kind of the electronic device. The hardware 800 in accordance with the present disclosure may include at least one of the aforementioned elements, and may omit some elements or further include additional other elements. Also, some of the elements of the hardware 800 in accordance with the present disclosure are coupled and constructed as one entity, thereby being able to identically perform the functions of the corresponding elements of before being coupled.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory computer readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101. The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. An electronic device comprising:
   a display;
   a communication interface;
   a memory storing executable instructions; and
   a processor operatively coupled to the display, the communication interface, and the memory, wherein the processor is, when executing the executable instructions, configured to:
   establish, by the communication interface, a communication connection between the electronic device and an external electronic device,
   receive an installation file of a first application from a server,
   install the first application, using the installation file of the first application, on the electronic device,
   receive, from the external electronic device via the communication connection, a notification that an installation of a sub application corresponding to the first application has been completed on the external electronic device, and
   in response to a request for removal of the first application installed in the electronic device, display, via the display, a message for the sub application installed in the external electronic device.

2. The electronic device of claim 1, wherein the processor is, when executing the executable instructions, further configured to:
   display, via the display, a user interface for a list, wherein the user interface includes an indicator that indicates the sub application installed in the external electronic device.

3. The electronic device of claim 1, wherein the processor is, when executing the executable instructions, further configured to receive an indication from the external electronic device whether the sub application is installed on the external electronic device or not installed on the external electronic device.

4. The electronic device of claim 1, wherein the processor is, when executing the executable instructions, further configured to transmit at least one portion of the installation file to the external electronic device, the at least one portion of the installation file to be used to install the sub application in the external electronic device.

5. The electronic device of claim 1, wherein the communication connection between the electronic device and the external electronic device is established using a first communication protocol.

6. The electronic device of claim 1, wherein the processor is, when executing the executable instructions, further configured to access the server using a network communication protocol.

7. A method comprising:
   establishing, by a communication interface in an electronic device, a communication connection between the electronic device and an external electronic device,
   receiving, by the electronic device, an installation file of a first application from a server,
   installing the first application on the electronic device, using the installation file of the first application, and
   receiving, from the external electronic device via the communication connection, a notification that an installation of a sub application corresponding to the first application has been completed on the external electronic device, and
   in response to a request for removal of the first application installed in the electronic device, displaying, via a display of the electronic device, a message for the sub application installed in the external electronic device.

8. The method of claim 7, further comprising:
   displaying, via the display, a user interface for a list, wherein the user interface includes an indicator that indicates the sub application installed in the external electronic device.

9. The method of claim 7, wherein receiving the notification further comprising:
   receiving an indication from the external electronic device whether the sub application is installed on the external electronic device or not installed on the external electronic device.

10. The method of claim 7, further comprising:
    transmitting at least one portion of the installation file to the external electronic device, the at least one portion of the installation file to be used to install the sub application in the external electronic device.

11. The method of claim 7, wherein the communication connection between the electronic device and the external electronic device uses a first communication protocol.

12. The method of claim 7, further comprising accessing the server using a network communication protocol.

13. A non-transitory computer-readable medium comprising a plurality of executable instructions, wherein execution of the plurality of executable instructions by one or more processors causes the one or more processors to perform a plurality of operations, the plurality of operations comprising:
    establishing, by a communication interface in an electronic device, a communication connection between the electronic device and an external electronic device,
    receiving, by the electronic device, an installation file of a first application from a server,
    installing the first application on the electronic device, using the installation file of the first application,
    receiving, from the external electronic device via the communication connection, a notification that an installation of a sub application corresponding to the first application has been completed on the external electronic device, and
    in response to a request for removal of the first application installed in the electronic device, displaying, via a display of the electronic device, a message for the sub application installed in the external electronic device.

14. A wearable device comprising:
    first communication circuitry to establish a first communication connection using a first communication protocol;
    second communication circuitry to establish a second communication connection using a second communication protocol;
    a touchscreen display; and
    a processor configured to:
       receive at least one portion of an installation file to be used to install a sub application from an electronic device, via the first communication connection established using the first communication circuitry, wherein the installation file is used to install a specified application corresponding to the sub application in the electronic device and obtained by the electronic device from a server via a third communication connection;
       install the sub application in the wearable device using the at least one portion of the installation file; and
       transmit a first signal to the electronic device when an installation of the sub application has been completed in the wearable device.

15. The wearable device of claim 14, wherein the first communication circuitry is configured to establish the first communication connection using a short range communication protocol as at least part of the first communication protocol, and wherein the second communication circuitry is configured to establish the second communication connection using a non-short range communication protocol as at least part of the second communication protocol.

16. The wearable device of claim 14, wherein the processor is configured to perform the receiving based at least in part on a determination that the wearable device is connected with the electronic device via the first communication connection.

17. The wearable device of claim 14, wherein the processor is configured to identify a smart watch device as at least part of the wearable device.

18. The wearable device of claim 14, wherein the processor is configured to transmit the first signal to the electronic device via the first communication connection established using the first communication circuitry.

19. A non-transitory computer-readable storage medium storing one or more programs, the one or more programs comprising instructions, which when executed by a wearable device with a touchscreen display, cause the wearable device to:
    receive at least one portion of an installation file to be used to install a sub application from an electronic device, via a first communication connection established using a first communication circuitry of the electronic device, wherein the installation file is used to install a specified application corresponding to the sub application in the electronic device and obtained by the electronic device from a server via a third communication connection;
    install the sub application in the wearable device using the at least one portion of the installation file; and
    transmit a first signal to the electronic device when an installation of the sub application has been completed in the wearable device.

20. The non-transitory computer-readable storage medium of claim 19, wherein the first communication circuitry is configured to establish the first communication connection using a short range communication protocol as at least part of a first communication protocol, and wherein a second communication circuitry is configured to establish a second communication connection using a non-short range communication protocol as at least part of a second communication protocol.

* * * * *